US012170714B2

(12) United States Patent
Mo et al.

(10) Patent No.: US 12,170,714 B2
(45) Date of Patent: Dec. 17, 2024

(54) CROSS HOST BEACON PROBING IN A VIRTUALIZED COMPUTING SYSTEM

(71) Applicant: VMware, Inc., Palo Alto, CA (US)

(72) Inventors: Dongrui Mo, Beijing (CN); Xi Cheng, Beijing (CN); Qiong Wang, Beijing (CN); Jingchun Jiang, Beijing (CN); Yonggang Wang, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/185,763

(22) Filed: Mar. 17, 2023

(65) Prior Publication Data

US 2024/0250920 A1 Jul. 25, 2024

(30) Foreign Application Priority Data

Jan. 19, 2023 (WO) ................ PCT/CN2023/000019

(51) Int. Cl.
*H04L 67/567* (2022.01)
*G06F 9/54* (2006.01)
*H04L 1/20* (2006.01)
*H04L 9/40* (2022.01)
(Continued)

(52) U.S. Cl.
CPC .............. *H04L 67/567* (2022.05); *G06F 9/54* (2013.01); *H04L 1/20* (2013.01); *H04L 49/90* (2013.01); *H04L 63/0421* (2013.01); *H04L 2101/622* (2022.05)

(58) Field of Classification Search
CPC ..... H04L 67/567; H04L 9/0847; H04L 61/58; H04L 63/0876; H04L 63/0435; H04L 63/0421; H04L 63/0414; H04L 63/0407; H04L 67/10; H04L 63/04; H04L 67/06; H04L 63/123; H04W 84/12; H04W 40/24; H04W 88/04; H04W 40/04; H04W 12/73; H04W 12/50; H04W 12/122; H04W 12/08; H04W 12/02; H04W 80/02; H04W 12/69; H04W 12/041; H04W 12/03; H04W 12/0431; H03M 13/3761; H04B 7/15528; G06F 21/6218; G06F 9/54; G06F 9/4881; G06F 16/183; G06F 16/152

See application file for complete search history.

(56) References Cited

U.S. PATENT DOCUMENTS

2013/0215776 A1* 8/2013 Verpooten ................. H04L 1/20
370/252
2018/0054853 A1* 2/2018 Rios Almanza ...... H04L 67/567
(Continued)

*Primary Examiner* — Kyung H Shin
(74) *Attorney, Agent, or Firm* — Kim & Stewart LLP (57) ABSTRACT

An example method of beacon probing in a computing system includes: sending, by cross-host beacon probing (CHBP) software executing in a first host of the computing system, a first beacon probe from a first network interface controller (NIC) of the first host to NICs on a same layer 2 domain as the first NIC, the NICs including a second NIC of the first host and cross-host NICs of at least one host other than the first host; receiving, at the CHBP software through the first NIC, acknowledgements (ACKs) to the first beacon probe from the cross-host NICs; and determining, in response to the first beacon probe, connectivity statuses of the first NIC and the second NIC by the CHBP software based on the ACKs and on whether the second NIC receives the first beacon probe.

20 Claims, 5 Drawing Sheets

(51) Int. Cl.
 *H04L 49/90* (2022.01)
 *H04L 101/622* (2022.01)

(56) References Cited

U.S. PATENT DOCUMENTS

2020/0084264 A1\* 3/2020 Staubly .................... G06F 9/54
2023/0043950 A1\* 2/2023 Wang ................. H04L 63/0421

\* cited by examiner

CROSS HOST BEACON PROBING IN A VIRTUALIZED COMPUTING SYSTEM

CROSS-REFERENCE

This application is based upon and claims the benefit of priority from International Patent Application No. PCT/CN2023/000019, filed on Jan. 19, 2023, the entire contents of which are incorporated herein by reference.

BACKGROUND

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. Hosts can be organized into clusters ("host clusters") and managed by a virtualization management server.

High availability (HA), which determines the quality of infrastructure at scale, is crucial for modern SDDCs to avoid prolonged scheduled or unscheduled downtime. For a host having VMs executing thereon, the host is practically required to have at least two network interface cards (NICs) in order to increase redundancy and lessen the effects of a non-functional NIC or non-functional link in the network to which the NIC is attached. Further, load balancing technologies take advantage of NIC redundancy on a host to increase network throughput. It becomes important for both HA and load balancing technologies to determine connectivity status of the network to which the NICs of a host are attached.

One technique for network failure detection is beacon probing. When beacon probing is enabled, the hypervisor periodically sends probing packets ("beacons") from each NIC to each other NIC. This establishes a heartbeat among the NICs of a host. Beacon probing, however, can only be enabled on hosts with three or more NICs. With only two NICs, beacon probing cannot determine which NIC should be taken out of service. Consider an example where a host has two NICs, where NIC1 is connected to switch1 and NIC2 is connected to switch2, and each of switch1 and switch2 has a link to switch3. If the link between switch2 and switch3 is broken, neither NIC1 nor NIC2 receive beacons or acknowledgements from each other. The same situation occurs, however, if the link between switch1 and switch3 occurs or both links to switch3 are broken. Thus, it becomes impossible to determine which link is broken and thus which NIC needs to be taken out of service.

With the widespread use of gigabit NICs, it becomes unnecessary to include more than two NICs on each host and the restriction of three or more NICs for use of beacon probing reduces the scope of its application. It is desirable to provide techniques for determining network connectivity on hosts with only two NICs.

SUMMARY

In embodiments, a method of beacon probing in a computing system includes: sending, by cross-host beacon probing (CHBP) software executing in a first host of the computing system, a first beacon probe from a first network interface controller (NIC) of the first host to NICs on a same layer 2 domain as the first NIC, the NICs including a second NIC of the first host and cross-host NICs of at least one host other than the first host; receiving, at the CHBP software through the first NIC, acknowledgements (ACKs) to the first beacon probe from the cross-host NICs; and determining, in response to the first beacon probe, connectivity statuses of the first NIC and the second NIC by the CHBP software based on the ACKs and on whether the second NIC receives the first beacon probe.

Further embodiments include a non-transitory computer-readable storage medium comprising instructions that cause a computer system to carry out the above methods, as well as a computer system configured to carry out the above methods.

DETAILED DESCRIPTION

Cross-host beacon probing in a virtualized computer system is described. In cross-host beacon probing, beacon probes are received at one host from network interface cards (NICs) of at least one other host. Cross-host beacon probing (CHBP) software executes in a first host. The CHBP software sends a first beacon probe from a first NIC in the first host to all NICs on a layer 2 domain. The layer 2 domain includes all NICs on the same sub-network (subnet) and includes a second NIC of the first host and cross-host NIC(s) of at least one other host. That is, the cross-host NIC(s) are not in the first host but disposed in other host(s). The CHBP software receives through the first NIC acknowledgements (ACKs) to the first beacon probe from the cross-host NICs. Since the second NIC is on the same host as the first NIC, the second NIC does not reply ACK to the first NIC. The CHBP is aware of whether the second NIC received the probe (e.g., through host memory). The CHBP software then determines connectivity statuses of the first NIC and the second NIC in its host based on the ACKs from the cross-host NICs and on whether the second NIC receives the first beacon probe. Using this technique, the first host (which performs the probing) does not require more than two NICs, as is required in traditional beacon probing discussed above. These and further aspects are described below with respect to the drawings.

Figure 1:
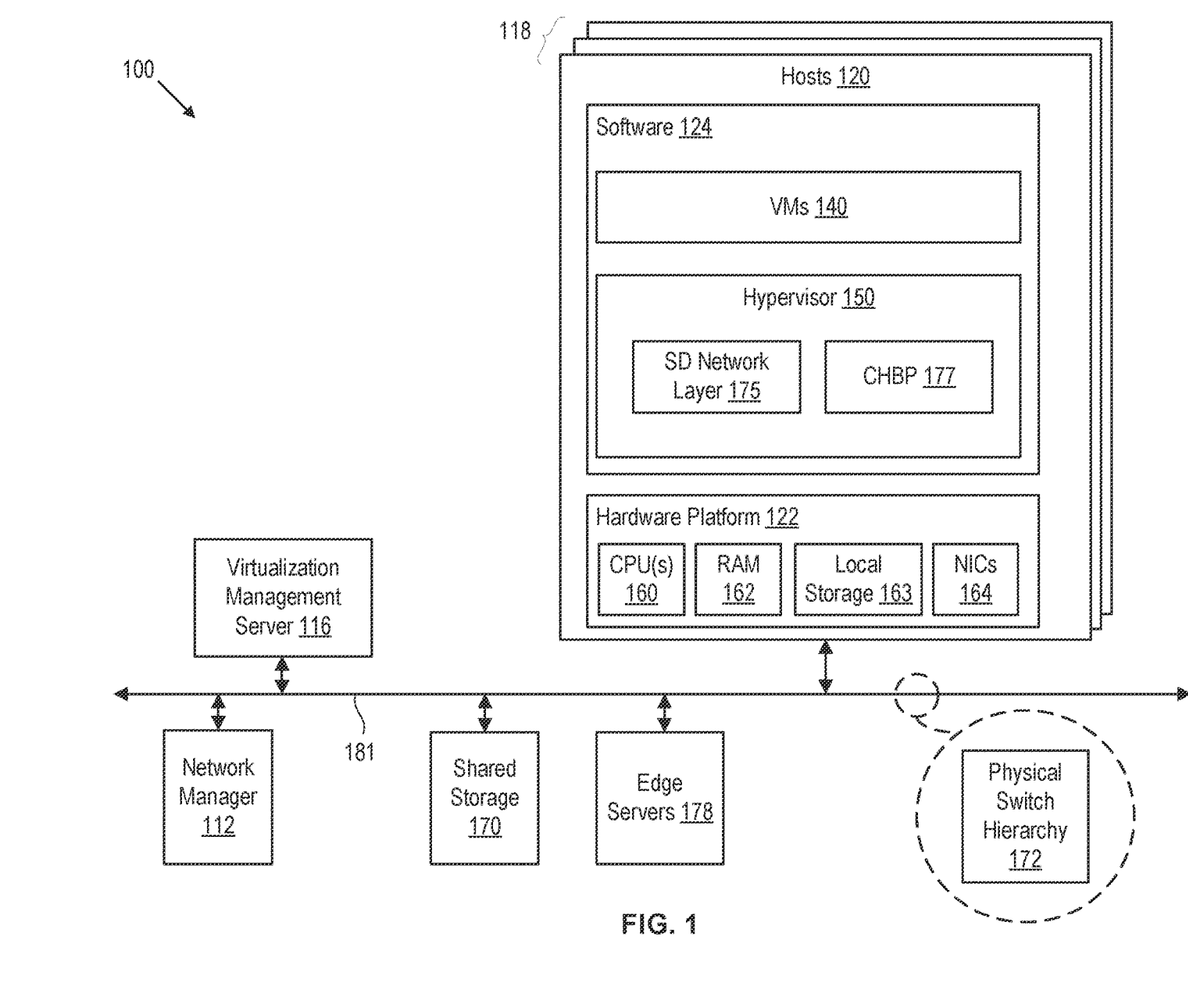
FIG. 1 is a block diagram of a virtualized computing system in which embodiments described herein may be implemented.
Figure 2:
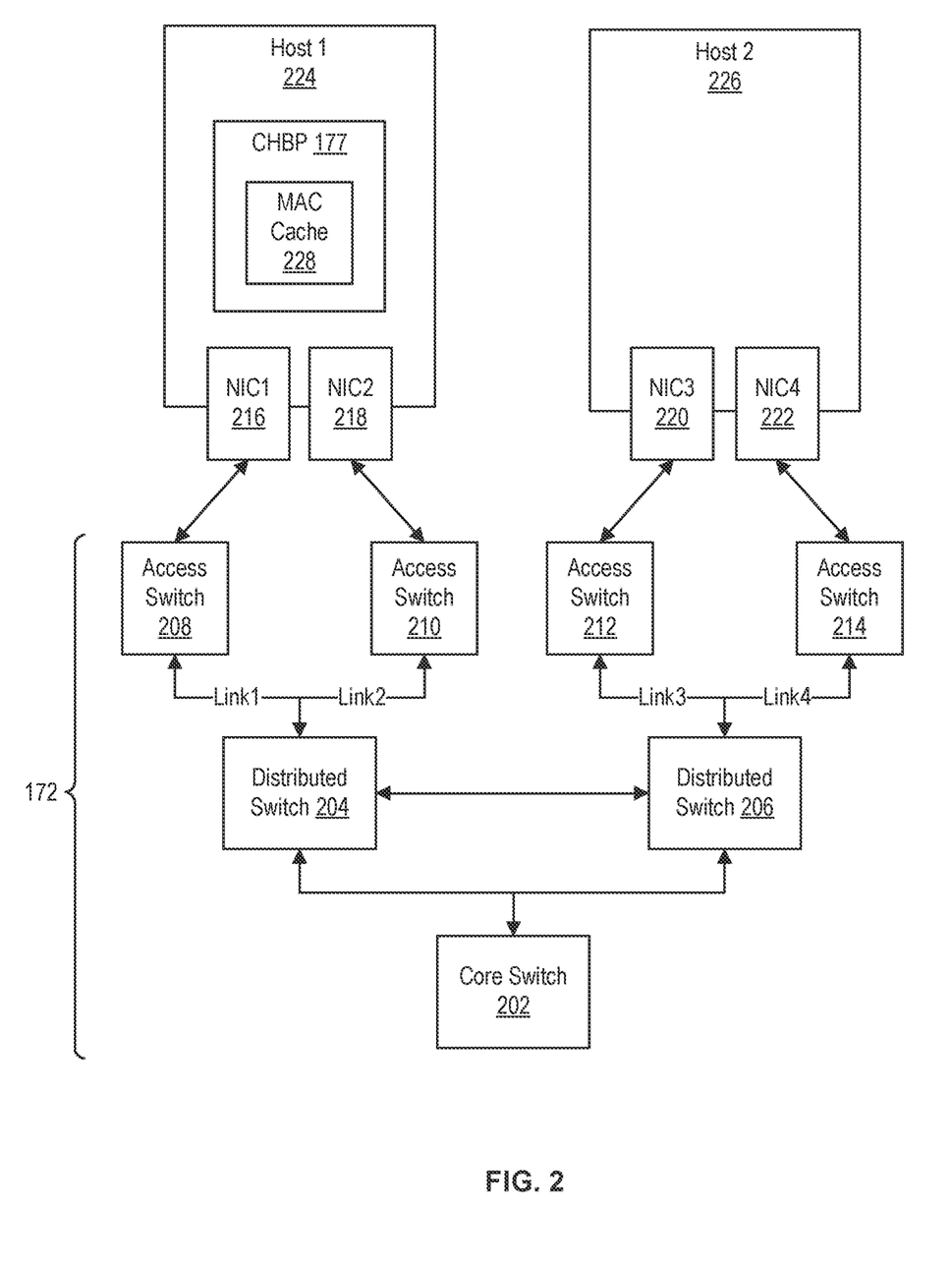
FIG. 2 is a block diagram depicting hosts connected to a physical switch hierarchy according to embodiments.

FIG. 1 is a block diagram of a virtualized computing system 100 in which embodiments described herein may be implemented. Virtualized computing system 100 includes hosts 120. Hosts 120 may be constructed on hardware platforms such as an x86 architecture platforms. One or more groups of hosts 120 can be managed as clusters 118. As shown, a hardware platform 122 of each host 120 includes conventional components of a computing device, such as one or more central processing units (CPUs) 160, system memory (e.g., random access memory (RAM) 162), a plurality of network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 181. Physical network 181 enables communication between hosts 120 and between other components and hosts 120 (other components discussed further herein). Physical network 181 can include a physical switch hierarchy 172. Physical switch hierarchy 172 includes a plurality of physical switches, such as access switches, distributed switches, and core switches arranged in a particular hierarchy. An example physical switch hierarchy is shown in FIG. 2 and described below.

In the embodiment illustrated in FIG. 1, hosts 120 access shared storage 170 by using NICs 164 to connect to network 181. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

Software 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. Hypervisor 150 executes cross-host beacon probing (CHBP) software 177. Cross-host (or cross host) means beacon probing using more than one host (e.g., between a NIC in one host and NIC(s) in other host(s), which are referred to as "cross-host NICs"). CHBP 177 can be used to detect connectivity problems on physical network 181, such as broken links in physical switch hierarchy 172. NICs 164 connected to broken links can be taken out of service. CHBP 177 functions even if there are only two NICs 164 in host 120 (i.e., CHBP 177 does not require 3 NICs in any host). Operation of CHBP 177 is discussed below.

In embodiments, virtualized computing system 100 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge servers, etc. Logical network services include logical switches and logical routers, as well as logical firewalls, logical virtual private networks (VPNs), logical load balancers, and the like, implemented on top of the virtualized infrastructure. In embodiments, virtualized computing system 100 includes edge servers 178 that provide an interface of host cluster 118 to a wide area network (WAN) (e.g., a corporate network, the public Internet, etc.). Edge servers 178 can be physical servers or VMs.

Virtualization management server 116 is a physical or virtual server that manages hosts 120 and the hypervisors therein. Virtualization management server 116 installs agent(s) in hypervisor 150 to add a host 120 as a managed entity. Virtualization management server 116 can logically group hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118. While only one virtualization management server 116 is shown, virtualized computing system 100 can include multiple virtualization management servers each managing one or more host clusters.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents in hypervisor 150 to add a host 120 as a managed entity, referred to as a transport node. In other embodiments, SD network layer 175 is orchestrated and managed by virtualization management server 116 without the presence of network manager 112.

FIG. 2 is a block diagram depicting hosts connected to a physical switch hierarchy according to embodiments. Physical switch hierarchy 172 includes a core switch 202, distributed switches 204 and 206, and access switches 208, 210, 212, and 214. Each distributed switch 204, 206 is connected to core switch 202. Distributed switches 204, 206 are also connected to each other. Access switches 208, 210 are connected to distributed switch 204. Access switches 212, 214 are connected to distributed switch 206. The links between access switches 208, 210 and distributed switch 204 are referred to as Link1 and Link2, respectively. The links between access switches 212 and 214 and distributed switch 206 are referred to as Link3 and Link4, respectively.

A host 224 ("host1") includes NICs 216 and 218. A host 226 ("host2") includes NICs 220 and 222. NIC 216 ("NIC1") is connected to access switch 208. NIC 218 ("NIC2") is connected to access switch 210. NIC 220 ("NIC3") is connected to access switch 212. NIC 222 ("NIC4") is connected to access switch 214. The NICs 216, 218, 220, and 222 connected to physical switch hierarchy 172 are on the same Layer 2 domain. A layer 2 domain includes all NICs on the same sub-network (subnet) such that traffic is switched among the NICs using MAC addresses.

In embodiments, host 224 executes CHBP 177. CHBP 177 includes a media access control (MAC) cache 228, described further below. CHBP 177 selects a NIC (e.g., NIC1) through which to perform beacon probing, as described further herein. During beacon probing. CHBP 177 sends beacons from NIC1 to other NICs on the Layer 2 domain (e.g., NIC2, NIC3, NIC4). In embodiments, each beacon comprises an L2ECHO packet as shown in FIG. 3 and described below.

Figure 3:
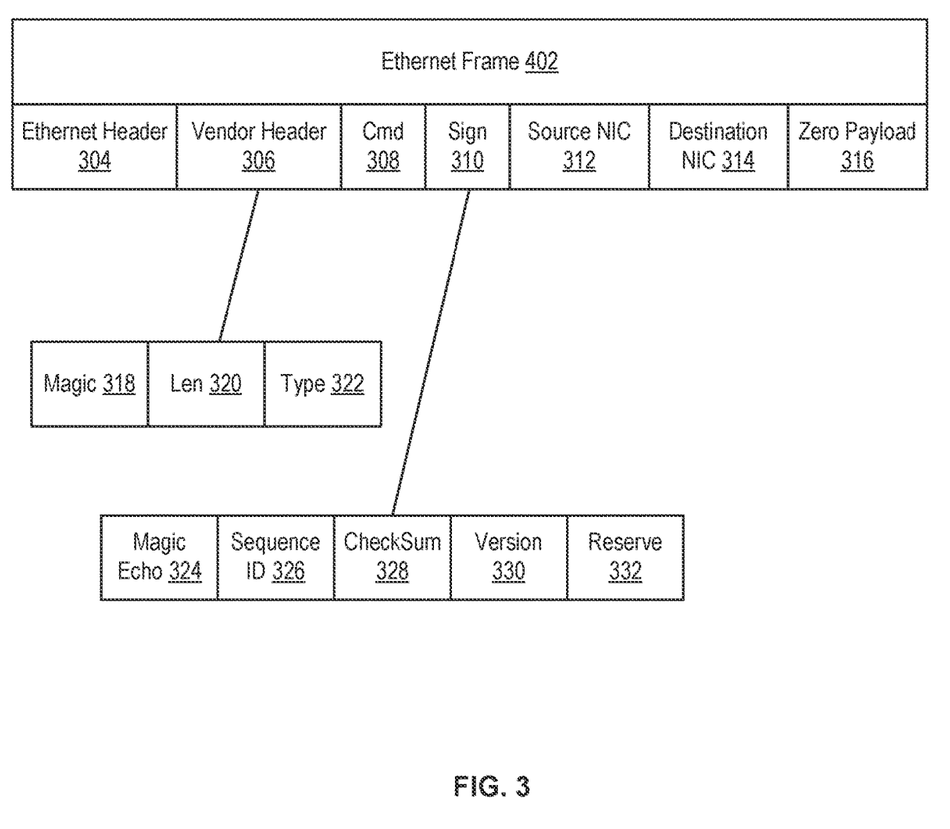
FIG. 3 is a block diagram depicting a beacon according to embodiments.

FIG. 3 is a block diagram depicting a beacon according to embodiments. In the embodiment, the beacon comprises an L2ECHO packet. The L2ECHO packet is encapsulated in an Ethernet payload and uses 0x8922 (Host byte order) as the type of Ethernet. Ethernet frame 402 includes an Ethernet Header 304. The length of Ethernet Header 304 depends on the type of Ethernet frame (Ethernet II or IEEE 802.3). Vendor header 306 appears after Ethernet Header 304. In embodiments, vendor header 306 comprises 7 bytes. Vendor header 306 can include three fields, namely, magic 318, len 320, and type 322. In embodiments, magic 318 comprises 4 bytes and is a fixed value. Len can be 2 bytes and specifies the length of the L2ECHO packet (without vendor header 306) in bytes. Type can be 1 byte and be a fixed value that determines the format of the remaining data in Ethernet Frame 402.

The portion of Ethernet Frame 402 after vendor header 306 is the payload. In embodiments, there are five parts to the payload: cmd 308, sign 310, source NIC 312, destination NIC 314, and zero payload 316. Cmd 308 can be 1 byte and can be set to two values: value 0 refers to echo-ack and value 1 refers to echo-request. The function of echo-request and echo-ack is similar to Internet Control Message Protocol (ICMP) request (ICMP type=8) and reply (ICMP type=0). That is, the host should reply echo-ack when receiving an echo-request packet. Sign 310 can by 16 bytes and can have five fields: magic echo 324, sequence ID 326, checksum 328, version 330, and reserve 332. In embodiments, magic echo 324 has 4 bytes and is a fixed value. Sequence ID can be 4 bytes and is the identifier of a set of packets. The packets (echo-ack and echo-request) used in a round of probing have the same sequence ID. Checksum 328 can be 2 bytes and is the checksum of the L2ECHO packet. Version 330 can be 1 byte and indicates the version of the L2ECHO packet. Reserve 332 can be 5 bytes and occupies the remaining portion of sign 310 (in embodiments, reserve 332 is unused). Source NIC 312 identifies a source NIC on the Layer 2 domain and destination NIC 314 identifies a destination NIC on the Layer 2 domain. Zero payload 316 includes any number of zeros to fill the packet. While specific fields and field sizes have been described, those skilled in the art will appreciate that the L2ECHO packet can include different fields/different sizes of the fields and function the same or similar as described herein.

As described further below, the basic workflow of the probing protocol is that a selected NIC transmits beacons (e.g., echo-request packets) to the NICs on the same Layer 2 domain. Depending on whether the beacons are received and acknowledged by the destinations, the connectivity status of each NIC is set accordingly. There are two mechanisms to determine whether a beacon has been received by a particular NIC. For NICs in a different host, the beacon is received if an ACK is received (e.g., an echo-reply). For NICs in the same host. CHBP 177 can track internally whether the NICs have received the beacon (no ACK is needed).

Figure 4:
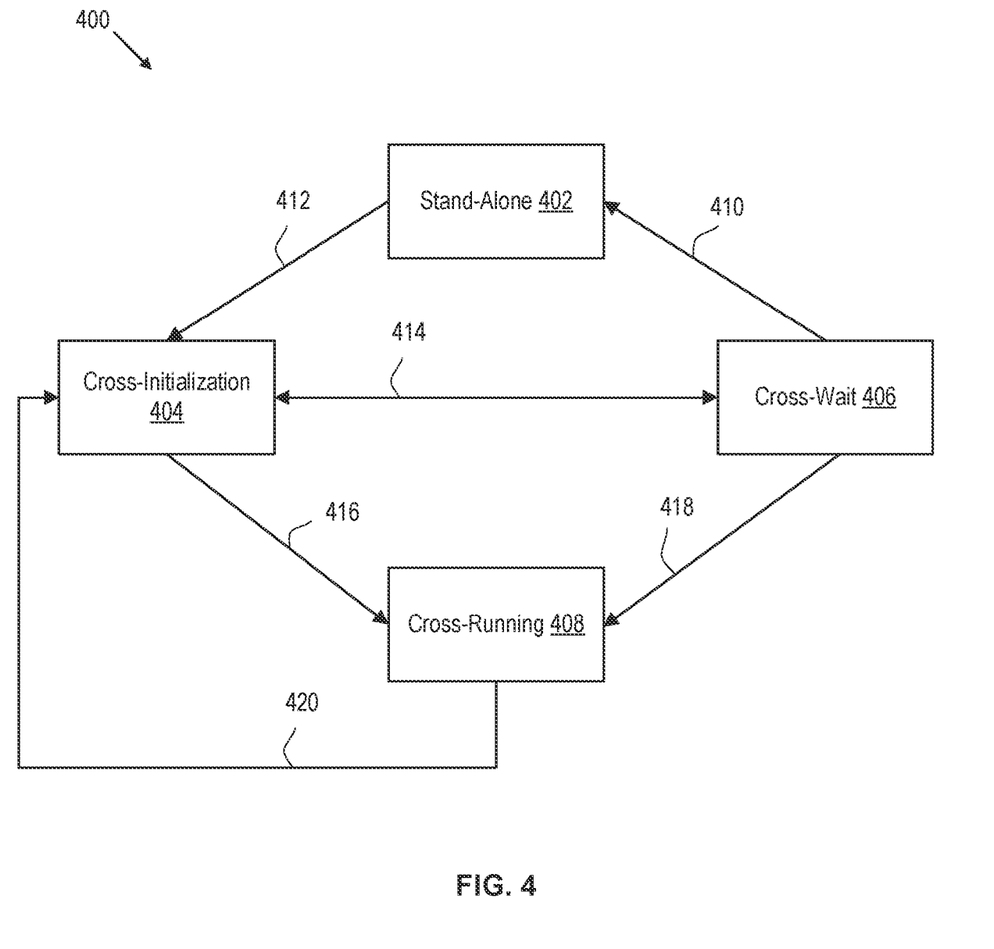
FIG. 4 is a block diagram depicting a state machine maintained by the cross-host beacon probing software according to embodiments.

FIG. 4 is a block diagram depicting a state machine 400 maintained by the cross-host beacon probing software according to embodiments. State machine 400 includes states of stand-alone 402, cross-initialization 404, cross-wait 406, and cross-running 408. State machine includes transitions 410, 412, 414, 416, 418, and 420 described below. The state of state machine 400 is derived from the number of available NICs in the host and the results of each probing round. For purposes of example, exception cases are omitted. For example, state machine 400 will stop if there is only a single NIC in the host as there can be no fail-over for a single point. Second, all non-stand-alone states will fall back to stand-alone state once the available NICs of the host is larger than two.

For operation of state machine 400 and CHBP 177, assume an example as shown in FIG. 2 where CHBP 177 is executing in Host having NIC1 and NIC2. CHBP 177 executes to monitor the connectivity statuses of NIC1 and NIC2. Assume an initial state where NIC1 is the initiating NIC. Further assume beacon probes comprise echo-requests and ACKs to the beacon probes comprise echo-replies.

The following terminology is employed: Blind-mode is a state of the connectivity status that CHBP 177 cannot distinguish. It is usually caused if there are two NICs connected to a host with CHBP enabled, but the physical network link between two NICs or certain NICs itself is/are broken. An initiating NIC is the NIC sending echo-requests. An initiated flag is a flag set when a certain NIC is selected as an initiating NIC. The connectivity status of the NIC is up and with this flag set, will be selected to send echo-requests. If there are no NICs in the host with this flag set, CHBP 177 will select a NIC in the host randomly from the available NICs having a status of up. Selected entries are entries of MAC cache 228 to be selected. The destination MAC addresses of certain probing rounds are derived from the selected entries, as described further below.

Stand-alone 402 is the initialized state. CHBP 177 will start in stand-alone 402 when the available NICs in the host are larger than two. CHBP 177 will transition from stand-alone 402 to cross-initialization 404 to avoid blind-mode if the available NICs in the host decreases to two or if some malfunction or outages reduces the available NICs in the host to two.

Cross-initialization 404 applies when the NICs available in the host are not enough to determine the connectivity status for the NICs by themselves without cross-host beacon probing. CHBP 177 will initially send a broadcast beacon probe (e.g., a broadcast echo-request) to learn MAC addresses of NICs in the same Layer 2 domain on other hosts. There are four possible workflows based on the probing result.

First, NIC1 does not receive echo-replies and NIC2 does not receive the echo-request. CHBP 177 will mark the connectivity status of NIC1 as down. CHBP 177 then changes the initiating NIC to NIC2 if NIC2 has not already been marked as initiating. If NIC2 has already been marked as initiating, CHBP 177 transitions (414) to cross-wait 406 and the initiating flags of both NICs are cleared.

Second, NIC1 does not receive echo-replies, but NIC2 receives the echo-request. The connectivity status of both NIC1 and NIC2 is set to up. CHBP 177 marks NIC2 as the initiating replacing NIC1 if NIC2 has not already been marked as initiating. Otherwise, CHBP 177 transitions (414) to cross-wait 406.

Third, NIC1 receives echo-relies, but NIC2 does not receive the echo-request. The connectivity status of NIC2 is set to down and NIC1 is set to up. CHBP 177 transitions (416) to cross-running 408.

Fourth, NIC1 receives echo-replies and NIC2 receives the echo-request. The connectivity status of both NIC1 and NIC2 is set to up. CHBP 177 transitions (416) to cross-running and the initiating flag for both NICs is cleared.

Cross-running 408 applies when CHBP 177 has learned MAC addresses of NICs on other hosts. The workflow of this state is to maintain MAC cache 228. The initiating NIC (NIC1) periodically sends echo-requests to the NICs whose MAC addresses are in MAC cache 228. There are four possible workflows based on the probing result.

First. NIC1 does not receive echo-replies and NIC2 does not receive the echo request. The connectivity status of NIC1 is set to down. CHPB 177 uses NIC2 as the initiating NIC if NIC2 has not been previously marked and CHPB 177 remains in cross-running 408. Otherwise, CHBP 177 transitions (420) to cross-initialization.

Second, NIC1 does not receive echo-replies, but NIC2 receives the echo request. The selected entries from MAC cache 228 are removed from MAC cache 228. If MAC cache 228 is not empty, CHBP 177 remains in cross-running 408 and NIC1 remains as the initiating NIC. Otherwise. CHBP 177 transitions (420) to cross-initialization 404.

Third, NIC1 receives echo-replies, but NIC2 did not receive the echo-request. The connectivity status of NIC2 is set to down and CHBP 177 remains in cross-running 408.

Fourth, NIC1 can receive echo-replies and NIC2 can receive the echo request. CHBP 177 remains in cross-running 208.

Cross-waiting 406 is designed to avoid state flipping from cross-initialization 404 to cross-running 408. Without cross-wait 406, the broadcast of echo-request could transmit periodically while network jitter occurs. In cross-wait 406, echo-requests are sent as in cross-running 408 and CHBP 177 transitions to cross-initialization 404 or cross-running 408 per the probing results. There are four possible workflows for cross-wait 406.

First, NIC1 does not receive echo-replies and NIC2 does not receive the echo-request. The connectivity status of NIC1 is set to down and the initiating NIC is changed to NIC2. There is no need to check the initiating flag in this case. CHBP 177 remains in cross-wait 406.

Second, NIC1 does not receive echo-replies and NIC2 does receive the echo-request. The connectivity status of both NIC1 and NIC2 is set to up. CHBP 177 transitions (410) to stand-alone 402 and the initiating flag is cleared on both NIC1 and NIC2.

Third, NIC1 receives echo-relies, but NIC2 does not receive the echo request. The connectivity status of NIC2 is set to down. CHBP 177 transitions (418) to cross-running 408 and the initiating flag for NIC2 is cleared.

Fourth, NIC1 receives echo-replies and NIC2 receives the echo request. The connectivity status of NIC1 and NIC2 is set to up. CHBP 177 transitions (418) to cross-running 408 and the initiating flag for NIC2 is cleared.

Referring to FIGS. 2 and 4, consider the following example use cases. In a first example, assume the initiating NIC is NIC1. CHBP 177 is in cross-running 408, and the MAC addresses of NIC3 and NIC4 are in MAC cache 228. The outage for this example is Link1. Since CHBP 177 is cross-running 408, NIC1 sends three unicast echo-requests to NIC2, NIC3, and NIC4, respectively. Since Link1 is broken, NIC2, NIC3, and NIC4 cannot receive the echo-requests. As a result, since NIC1 does not receive echo replies and NIC2 does not receive the echo request, CHBP 177 sets the connectivity status of NIC1 to down. If teaming is enabled, CHBP 177 can output an indication that NIC1 is down and all traffic of host1 can be switched to NIC2. Following that, NIC2 starts to send echo-requests to NIC1, NIC3, and NIC4 as the initiating NIC. NIC3 and NIC4 receive the echo-requests and send echo-relies to NIC2. NIC1 cannot receive the echo-request from NIC1. In this case, the initiating NIC (NIC2) receives echo-replies, but NIC1 does not receive the echo-request. In this case. CHBP 177 remains cross-running 408 and NIC2 remains the initiating NIC.

In a second example, the initiating NIC is NIC1, CHPB 177 is cross-running 408, the MAC addresses of NIC3 and NIC4 are in MAC cache 228. The outages is a power-off of Host2, causing echo-requests not being received by NIC3 and NIC4. NIC1 does not receive echo-replies from NIC3 and NIC4. CHBP 177 removes the MAC addresses of NIC3 and NIC4 from MAC cache 228. In this case, MAC cache 228 becomes empty. As such, CHBP 177 transitions to cross-initialization 404. In cross-initialization 404. NIC1 sends a broadcast echo-request on the L2 domain. NIC1 does not receive echo-replies (since NIC3 and NIC4 are down), and NIC2 receives the echo-request, so in this case CHBP 177 changes the initiating NIC from NIC1 to NIC2. NIC2 then sends a broadcast echo-request on the L2 domain, but also does not receive echo-replies (while NIC1 receives the echo-request). Hence, CHBP 177 transitions to cross-wait 406 and clears the initiating flags of NIC1 and NIC2. In cross-wait 406, CHBP 177 selects NIC1 as the initiating NIC by random selection (in this example). NIC1 continues to send echo-requests to NIC2 only as there are no MAC addresses in MAC cache 228. NIC2 receives the echo-requests, causing CHBP 177 to transition to stand-alone 402.

Figure 5:
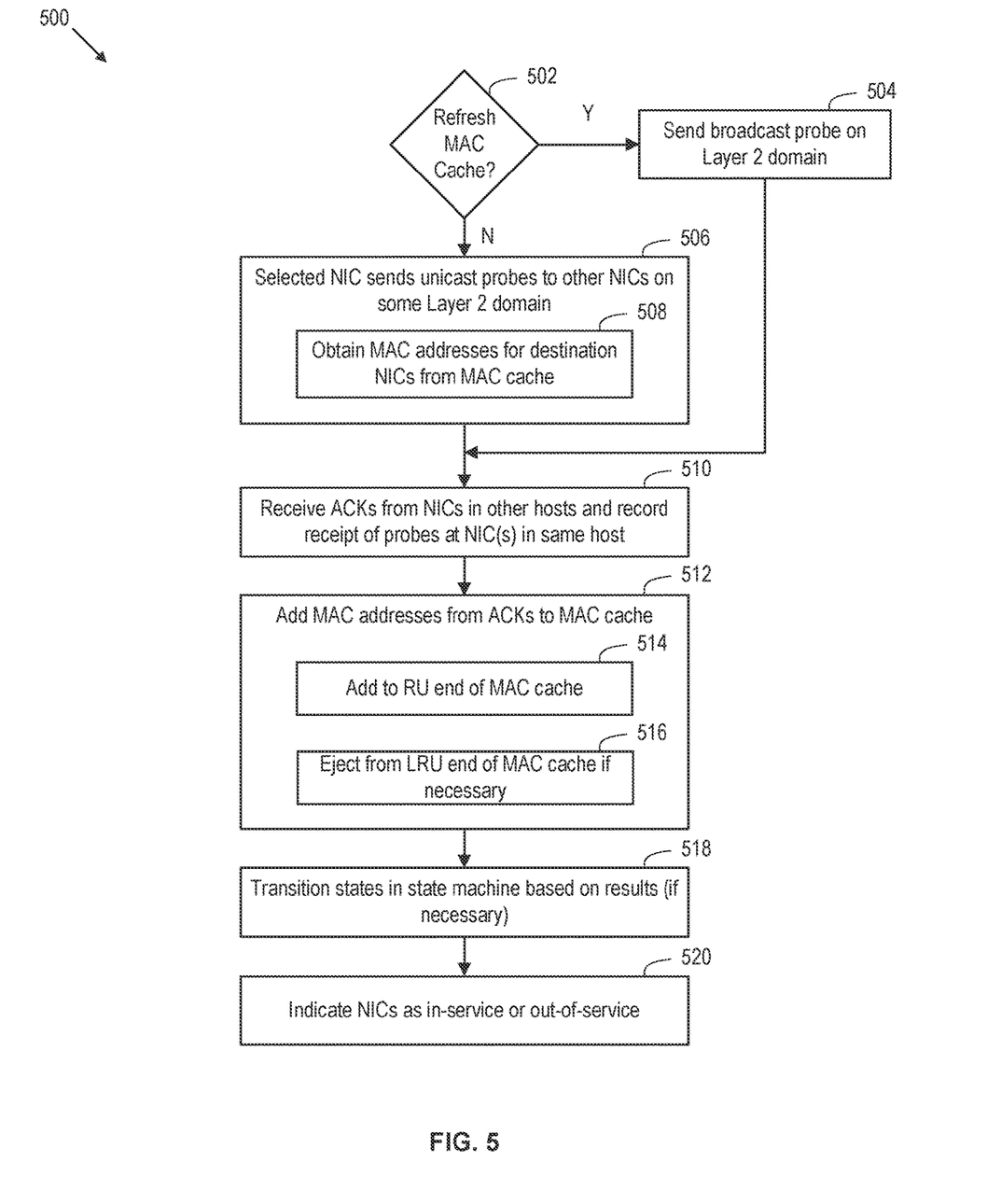
FIG. 5 is a flow diagram depicting a method of cross-host beacon probing according to an embodiment.

FIG. 5 is a flow diagram depicting a method 500 of cross-host beacon probing according to an embodiment. Method 500 begins at step 502, where CHBP 177 determines whether to refresh MAC cache 228. For example, as described above, CHBP 177 can transition to cross-initialization 404 where the initiating NIC sends broadcast echo-requests on the L2 domain. CHBP 177 can then learn MAC addresses from echo-replies. Thus, if MAC cache should be refreshed, method 500 proceeds to step 504, where CHBP 177 causes the initiating NIC to send broadcast beacon probe(s) on the L2 domain. Otherwise, method 500 proceeds to step 506. At step 506, CHBP 177 causes the initiating NIC to send unicast beacon probes to selected NICs on the L2 domain. For example, CHBP 177 can be in cross-running 408. CHBP 177 can obtain MAC addresses from MAC cache 228 to choose the selected NICs (508).

Generating broadcast echo-requests and receiving echo-replies allows CHBP 177 to obtain MAC addresses of NICs on the L2 domain (e.g., from the Ethernet headers). However, too many broadcast packets in the L2 domain can overwhelm switches as they struggle to keep up with processing the flood of packets. To optimize performance. CHBP 177 includes MAC cache 228. The advantage of MAC cache 228 is that there is no need to depend on repeated broadcast of echo-requests if there are MAC addresses available in the cache. In embodiments. MAC cache 228 can be a least recently used (LRU)-based cache to address the issue of expiring MAC addresses caused by host migration or NIC replacement. For the LRU implementation. MAC cache 228 includes two endpoints: recently used (RU) end and least recently used (LRU) end. In this approach, an entry is moved to the RU end when an echo-reply includes a source MACA that matches a MAC address in MAC cache 228. Entries in MAC cache 228 correlated with non-existing NICs will be moved to the LRU end since there will be no echo-replies to refresh the entries. Additionally, CHBP 177 can eject entries from MAC cache 228 once there is no space to carry new MAC entries when there are echo-replies from new NICs. In embodiments, MAC cache 228 can be shared among other hosts so that CHBP software on those hosts does not have to send out broadcast echo-requests. In embodiments, at step 508, CHBP 177 can obtain MAC addresses for the selected NICs from the LRU end of MAC cache 228. The benefit of selecting from the LRU end is that CHBP 177 can discover expired MAC addresses as soon as possible. The selected number of MAC addresses for the unicast echo-requests should be less than the size of MAC cache 228 from the perspective of performance.

At step 510, CHBP 177 receives ACKS to the beacon probes from NICs in other hosts through the initiating NIC. CHBP 177 also records receipt of the beacon probes at NIC(s) in the same host. At step 512, CHBP 177 manages MAC cache 228 based on the ACKs. For example, at step 514. CHBP 177 can move/add MAC address entries to the RU end of MAC cache 228 if the MAC addresses are refreshed by the ACKs. At step 516, CHBP 177 can eject MAC addresses from the LRU end of MAC cache 228 if necessary.

At step 518, CHBP 177 can transition states in its state machine depending on the results of the beacon probing as discussed above. At step 520, CHBP 177 can indicate NICs in the host as being either in-service or out-of-service depending on the results of the beacon probing.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of beacon probing in a computing system, comprising:
   sending, by cross-host beacon probing (CHBP) software executing in a first host of the computing system, a first beacon probe from a first network interface controller (NIC) of the first host to NICs on a same layer 2 domain as the first NIC, the NICs including a second NIC of the first host and cross-host NICs of at least one host other than the first host;
   receiving, at the CHBP software through the first NIC, acknowledgements (ACKs) to the first beacon probe from the cross-host NICs; and
   determining, in response to the first beacon probe, connectivity statuses of the first NIC and the second NIC by the CHBP software based on the ACKs and on whether the second NIC receives the first beacon probe.

2. The method of claim 1, wherein the first beacon probe comprises a broadcast packet, and wherein the CHBP software stores media access control (MAC) addresses of the cross-host NICs in a MAC cache in response to the ACKs.

3. The method of claim 1, wherein the CHBP software maintains a media access control (MAC) cache, and wherein the CHBP software sends the first beacon probe as unicast packets to the NICs on the layer 2 domain using MAC addresses in the MAC cache.

4. The method of claim 1, wherein the CHBP software, in response to the first beacon probe, indicates the second NIC as being up in response to the second NIC receiving the first beacon probe or indicates the second NIC as being down in response to the second NIC not receiving the first beacon probe.

5. The method of claim 1, further comprising:
   sending, by the CHBP software, a second beacon probe from the first NIC to the NICs on the layer 2 domain;
   detecting, by the CHBP software, absence of ACKs to the second beacon probe from the cross-host NICs; and
   determining, in response to the second beacon probe, connectivity statuses of the first NIC and the second NIC by the CHBP software based on the absence of the ACKs and on whether the second NIC receives the second beacon probe.

6. The method of claim 5, wherein the CHBP software, in response to the second beacon probe, indicates the first and second NICs as being up in response to the second NIC receiving the second beacon probe or indicates the first NIC as being down in response to the second NIC not receiving the second beacon probe.

7. The method of claim 6, wherein the CHBP software, in response to determining that the first NIC is down, sends at least one beacon probe from the second NIC to the NICs on the layer 2 domain.

8. A non-transitory computer readable medium comprising instructions to be executed in a computing device to cause the computing device to carry out a method of beacon probing in a computing system, comprising:
sending, by cross-host beacon probing (CHBP) software executing in a first host of the computing system, a first beacon probe from a first network interface controller (NIC) of the first host to NICs on a same layer 2 domain as the first NIC, the NICs including a second NIC of the first host and cross-host NICs of at least one host other than the first host;
receiving, at the CHBP software through the first NIC, acknowledgements (ACKs) to the first beacon probe from the cross-host NICs; and
determining, in response to the first beacon probe, connectivity statuses of the first NIC and the second NIC by the CHBP software based on the ACKs and on whether the second NIC receives the first beacon probe.

9. The non-transitory computer readable medium of claim 8, wherein the first beacon probe comprises a broadcast packet, and wherein the CHBP software stores media access control (MAC) addresses of the cross-host NICs in a MAC cache in response to the ACKs.

10. The non-transitory computer readable medium of claim 8, wherein the CHBP software maintains a media access control (MAC) cache, and wherein the CHBP software sends the first beacon probe as unicast packets to the NICs on the layer 2 domain using MAC addresses in the MAC cache.

11. The non-transitory computer readable medium of claim 8, wherein the CHBP software, in response to the first beacon probe, indicates the second NIC as being up in response to the second NIC receiving the first beacon probe or indicates the second NIC as being down in response to the second NIC not receiving the first beacon probe.

12. The non-transitory computer readable medium of claim 8, further comprising:
sending, by the CHBP software, a second beacon probe from the first NIC to the NICs on the layer 2 domain;
detecting, by the CHBP software, absence of ACKs to the second beacon probe from the cross-host NICs; and
determining, in response to the second beacon probe, connectivity statuses of the first NIC and the second NIC by the CHBP software based on the absence of the ACKs and on whether the second NIC receives the second beacon probe.

13. The non-transitory computer readable medium of claim 12, wherein the CHBP software, in response to the second beacon probe, indicates the first and second NICs as being up in response to the second NIC receiving the second beacon probe or indicates the first NIC as being down in response to the second NIC not receiving the second beacon probe.

14. The non-transitory computer readable medium of claim 13, wherein the CHBP software, in response to determining that the first NIC is down, sends at least one beacon probe from the second NIC to the NICs on the layer 2 domain.

15. A computing system, comprising:
a first host comprising a first hardware platform including a first network interface controller (NIC) and a second NIC;
a second host comprising a second hardware platform including a third NIC and a fourth NIC, the first, second, third, and fourth NICs being on a same layer 2 domain;
cross-host beacon probing (CHBP) software, executing in the first host, configured to:
send a first beacon probe from the first NIC of the first host to NICs on the layer 2 domain, the NICs including a second NIC, the third NIC, and the fourth NIC;
receive, through the first NIC, acknowledgements (ACKs) to the first beacon probe from the third and fourth NICs; and
determine, in response to the first beacon probe, connectivity statuses of the first NIC and the second NIC based on the ACKs and on whether the second NIC receives the first beacon probe.

16. The computing system of claim 15, wherein the first beacon probe comprises a broadcast packet, and wherein the CHBP software stores media access control (MAC) addresses of the cross-host NICs in a MAC cache in response to the ACKs.

17. The computing system of claim 15, wherein the CHBP software maintains a media access control (MAC) cache, and wherein the CHBP software sends the first beacon probe as unicast packets to the NICs on the layer 2 domain using MAC addresses in the MAC cache.

18. The computing system of claim 15, wherein the CHBP software, in response to the first beacon probe, indicates the second NIC as being up in response to the second NIC receiving the first beacon probe or indicates the second NIC as being down in response to the second NIC not receiving the first beacon probe.

19. The computing system of claim 15, wherein the CHBP software is configured to:
Send a second beacon probe from the first NIC to the NICs on the layer 2 domain;
detect absence of ACKs to the second beacon probe from the third and fourth NICs; and
determine, in response to the second beacon probe, connectivity statuses of the first NIC and the second NIC based on the absence of the ACKs and on whether the second NIC receives the second beacon probe.

20. The computing system of claim 19, wherein the CHBP software, in response to the second beacon probe, indicates the first and second NICs as being up in response to the second NIC receiving the second beacon probe or indicates the first NIC as being down in response to the second NIC not receiving the second beacon probe.

\* \* \* \* \*